Dec. 25, 1951  R. H. JOHNSON  2,580,228
SUPERSONIC WIND TUNNEL
Filed Oct. 31, 1950
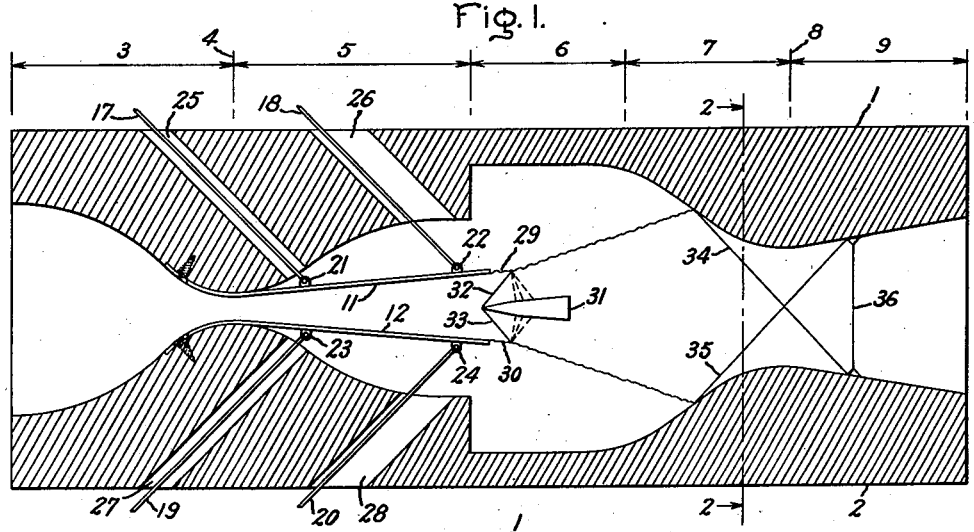
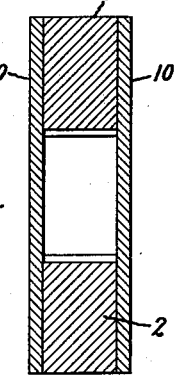
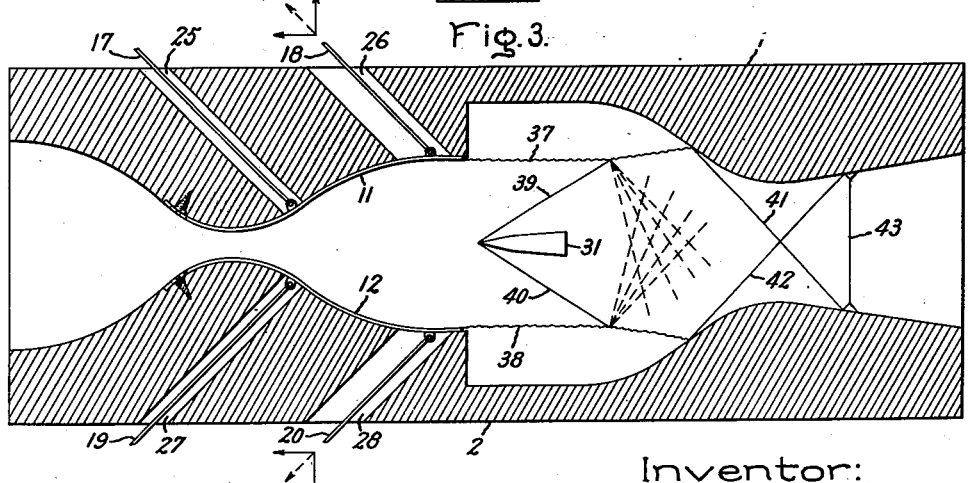
Inventor:
Robert H. Johnson,
by Paul A. Frank
His Attorney.

Patented Dec. 25, 1951

2,580,228

UNITED STATES PATENT OFFICE 2,580,228

SUPERSONIC WIND TUNNEL

Robert H. Johnson, Schenectady, N. Y., assignor to General Electric Company, a corporation of New York Application October 31, 1950, Serial No. 193,259

3 Claims. (Cl. 73—147)

1

This invention relates to supersonic wind tunnels and to methods for readily and economically initiating supersonic gaseous flow in such tunnels. More particularly, the present invention relates to a supersonic wind tunnel for testing relatively large models, which is characterized by low starting losses.

The present invention is an improvement over that set forth in my copending application Serial No. 44,936, filed August 18, 1948, now U. S. Patent No. 2,570,129, and assigned to the same assignee as the present application.

The Mach number at the minimum area or throat of a supersonic wind tunnel nozzle is theoretically equal to 1. As the area downstream of the throat increases, the Mach number increases since the Mach number at any point downstream of the throat is a function of the ratio of the area of the section at any point to the area of the throat. As the Mach number increases, the static pressure decreases. The change from supersonic to subsonic flow is almost instantaneous and occurs through what is known as a shock wave in the expanding section of the diffuser. The higher the Mach number at which the shock wave occurs, the greater are the losses in the wave. Hence, it is desirable that the transfomation from supersonic to subsonic flow occur at as low a Mach number as is feasible. However, since the Mach number downstream of the point of minimum area is a function only of the area ratio, the most efficient shock occurs at a point where the Mach number is slightly greater than 1, and this point is one at which the area is slightly greater than the throat area.

In an effort to reduce operating losses, supersonic wind tunnels have been constructed, progressing downstream, with a first throat, a supersonic expansion section, a test section, a contracting section, a second throat of greater area than the first throat, and a subsonic expansion section. Since the entropy level of the fluid increases between the throats due to frictional losses, losses due to the drag of the model being tested, etc., the second throat must of necessity be of greater area than the first throat to prevent choking in the second throat.

In operating a standard supersonic wind tunnel having two throats and a test section therebetween, after choking is established in the first throat at Mach number 1, and as the pressure differential across the wind tunnel increases, the supersonic flow starts to move through the supersonic expansion section of the tunnel, the downstream boundary of the supersonic flow being a shock wave. As the pressure differential is increased still further, the shock wave moves into and through the test section, and into the contracting section from which it jumps through the second throat to some downstream point compatible with the existing pressure differential. When this condition is attained, the flow in the tunnel from the first throat to the shock wave downstream of the second throat is supersonic. Operating losses are reduced by reducing the pressure differential and causing the shock wave to back up as close as possible to the second throat.

Because of the difficulty of pulling the shock wave through the second throat, it has become the practice to make the second throat very much larger than the first throat. Then, once the shock wave has passed through the second throat, the latter is reduced in area by mechanical means to a point which still permits the passage of the mass flow, and the shock wave is backed up close to the second throat. The above procedure also reduced the operating power losses.

The problem of starting such wind tunnels presents another problem in power losses. In normal methods of operation, since the moving shock wave must traverse the greatest area between the first and second throats, it is requisite that enough power be furnished to obtain a pressure differential corresponding to the losses across the shock wave when the Mach number ahead of the shock wave is at a maximum between the first and second throats. Consequently, the power systems of such wind tunnels are designed to supply sufficient power at the above critical point which is a function of the maximum Mach number obtained in the tunnel. However, once supersonic flow is established between the two throats, the only power requirements are those necessary to maintain the mass flow through the tunnel and to satisfy the pressure differential corresponding to the shock wave which is beyond the second throat.

The above-cited copending application describes a means of reducing the power requirements for starting a wind tunnel of the type discussed herein. Essentially, the movement of the shock wave through the entire range of Mach numbers occurring between the first and second throats is eliminated, and hence the starting power requirement reduced, by temporarily changing the configuration of the tunnel. The nozzle of contour blocks of this tunnel are made in the usual outline having, in order progressing downstream, an inlet nozzle or converging section, a first throat, a supersonic expansion section, a parallel-walled test section, a converging section, a second throat, and a diverging section. A pair of movable, flexible wall sections are used during starting periods to restrict the portion of the tunnel between the first and second throats to a steadily diverging channel. The tunnel is operated to produce a pressure differential such that choking occurs at the first throat at Mach number 1. The pressure differential is then increased further until the shock wave is driven downstream through the straight diverging channel and beyond the second throat. Supersonic flow having now been established between the first and second throats, the flexible walls are withdrawn against the nozzle blocks to conform to the normal wind tunnel configuration. By this method the large pressure differentials ordinarily required to move the shock wave through a high Mach number region are eliminated, a pressure differential only slightly greater than that for normal operation being required for starting.

While the above-described wind tunnel of the copending application is of great advantage in testing models of the usual size, a further problem arises when models are tested which present a relatively large cross-sectional area to the gaseous flow through the tunnel. Under such conditions, with the flexible walls in starting position, there is a tendency for the gaseous flow through the tunnel to be too great for the relatively small starting space between the test model and the flexible walls when the model is relatively large, when the shock waves produced by the model are excessively strong, or under a combination of the above conditions. The resultant choking effect tends to prevent the establishment of supersonic flow conditions through the tunnel.

It is an object of this invention to provide a supersonic wind tunnel which is characterized by low starting losses.

Another object of the invention is to provide a simplified arrangement for starting supersonic wind tunnels with low starting power requirements.

A further object of the present invention is to provide a supersonic wind tunnel in which choking during starting due to relatively large models or produced by shock waves is eliminated.

Other objects will become apparent from a consideration of the following description and the drawing in which Fig. 1 is a longitudinal sectional view of a wind tunnel of my invention under starting condiitons; Fig. 2 is a cross-sectional view of the tunnel taken in the direction 2—2 of Fig. 1; and Fig. 3 is a view similar to that of Fig. 1 with the tunnel in operating condition.

It has been found that an improved supersonic wind tunnel which is characterized by low starting losses and the absence of choking effects during starting due to the presence of relatively large test models or excessive shock waves may be very readily provided.

More particularly, it has been found that such a wind tunnel may be afforded by making the test or working section of the tunnel relatively larger than the maximum area of the expanding or nozzle section which is directly downstream of the first throat and by providing flexible starting walls which extend from the first throat to the working or test section.

Such an arrangement represents a distinct improvement over the wind tunnel of my copending application. First of all, whereas in my prior tunnel the flexible walls were required to be extended from the first to the second throat, the present invention with its flexible walls extending only from the first throat to the test section represents a simplification in the mechanical structure and arrangement required to operate the movable walls. Secondly, the enlargement of the present test section over that of the prior structure permits, without choking during the starting operation, the use of larger test models or those which produce excessively strong shock waves as compared to those which may be used with the prior wind tunnel.

For a better understanding of the invention, reference is made to the drawing.

Fig. 1 represents the present wind tunnel under starting conditions. Contour blocks 1 and 2, which as placed are mirror images one of the other, are shaped as shown to form a converging compression section 3, a first throat 4, a diverging supersonic expansion section 5, a test or working section 6, a converging or contracting section 7, a second throat 8, and a final diverging section 9. It will be noted that the wall of test or working section 6 is not merely an extension of the supersonic expansion section wall, but is abruptly displaced outwardly to provide a relatively larger test section cross-sectional area. Flat plates 10 shown in Fig. 2 and suitably fixed to blocks 1 and 2 form the two side walls of the two-dimensional wind tunnel. Wind tunnels such as that described herein are called two-dimensional because all sections parallel to those shown in Figs. 1 and 3 have identical contours, the only changes in contour occurring in the upstream or downstream directions. It will be seen, then, that the area at any section of the tunnel is a function only of the ordinate at the section.

Also provided in the wind tunnel are flexible walls 11 and 12, of the same width as the tunnel channel, which are fixed to contour blocks 1 and 2 respectively above the first throat. These flexible walls during the starting of the tunnel follow the shape of the contour blocks until a point just downstream of the first throat. From this point the walls diverge steadily in straight lines and at constant slope to a point just downstream of the juncture of the expansion section 5 and working section 6 so that when the walls are flexed and withdrawn to conform to the shape of the contour blocks, they will not quite extend into the working section. Preferably, the lines of position of the walls during the starting operation are such that their extensions are tangential to the second throat contour.

The flexible walls are supported at predetermined points by rods 17 and 18 for wall 11 and 19 and 20 for wall 12. These rods are connected pivotally to tabs 21 and 22 and 23 and 24 respectively mounted on walls 11 and 12. Provided in the contour blocks are holes or passages 25 and 26 for rods 17 and 18 and holes or passages 27 and 28 for rods 19 and 20 respectively.

The force exerted at 21 and 23 to deform the walls should be a tension force and applied approximately perpendicular to the tunnel contour adjacent the point of application so that the flexible wall will conform to the tunnel contour. In order to cause the downstream portion of the flexible wall to conform to the contour of the curved section, it is requisite that a force be applied to, in effect, buckle the wall. This buckling force should further be applied to the wall as though the latter were a column, in an upstream direction and at an angle to the face of the wall. The component forces exerted on the rods are represented by the force arrows in Fig. 3.

In starting the tunnel, the blower or induction type system is operated until a pressure differential is established at which choking occurs at the first throat at Mach number 1, the flexible walls 11 and 12 being in the position shown in Fig. 1 and providing a steadily diverging expansion section. The pressure differential is then increased to drive the shock wave downstream through the second throat. Although some losses occur in this temporary expansion section because it is not the most efficient shape for the supersonic expansion, they are relatively small. The jet boundaries of the supersonic flow after it leaves the retaining flexible walls is represented by lines 29 and 30. These lines are constant pressure, free stream lines and are not fixed or held constant by a containing wall. Thus, any tendency toward choking between the flexible wall and the forepart of model 31 is immediately relieved by a spreading apart of jet lines 29 and 30 as shown to accommodate the extra flow. Likewise, shock waves generated by the model such as bow waves 32 and 33 intersect jet lines 29 and 30 in free space, and, instead of producing a choking effect, merely divert lines 29 and 30 as shown. The jet boundaries intersect the ends of shock waves 34 and 35 diverting the flow to conform with converging section 7.

When the shock wave 36 produced by shock waves 34 and 35 has been established downstream of the second throat, rods 17, 18, 19, and 20 are actuated by any suitable means by forces having the direction indicated by the force arrows in Fig. 3, causing flexible walls 11 and 12 to withdraw and assume the shape of the contour blocks as shown.

With the withdrawal of the flexible walls the flow is bounded by jet lines 37 and 38. The model bow shock waves 39 and 40, now describing a lesser angle than during the starting operation, intersect jet lines 37 and 38, as shown, deflecting the latter as they proceed downstream to reflect at the tunnel wall forming shock waves 41 and 42 and, finally, standing wave 43 downstream of the second throat. Shock wave 43 may be made to stand up close to the second throat and reduce losses by simply lowering the pressure differential.

From the above it will be apparent that in the present method of starting a supersonic wind tunnel the tremendous pressure differential required to move the shock through a region of high Mach numbers is reduced, the only pressure differential required being one slightly greater than that necessary to operate the wind tunnel after starting.

It will further be apparent that the expanded test or working section allows the testing of relatively large models which otherwise would produce a choking effect during the starting operation which delays or may even prevent the establishment of supersonic flow in the tunnel. It will also be clear that the present expanded test section minimizes the disturbing effect of shock waves produced by the model being tested.

What I claim as new and desire to secure by Letters Patent of the United States is:

1. In a supersonic tunnel comprising contour blocks of pre-shaped contour, defining a two-throated passage with an enlarged test section disposed between said throats, a pair of flexible walls attached to said contour blocks and conforming to the contour thereof to the first throat of said tunnel, said flexible walls then being disposed in a steadily diverging manner downstream of said throat to and terminating at the beginning of said test section, and means for deforming said diverging section of said flexible walls to conform with the shape of said contour blocks downstream of said throat.

2. A two-throated supersonic wind tunnel comprising nozzle blocks of preshaped contour forming in order progressing downstream, an inlet nozzle section, a first throat, a supersonic expansion section, a parallel walled test section, a supersonic compression section, a second throat and a subsonic diffusion section, said test section being substantially larger in cross-section than said supersonic expansion section with an abrupt line of demarcation between said sections, a pair of flexible walls attached to said nozzle blocks and following the contour thereof substantially to the first throat in said tunnel, said flexible walls then being disposed in a steadily diverging manner downstream of said first throat to the beginning of the test section, and means for deforming the diverging section of said flexible walls to conform with the contour of said nozzle blocks.

3. A two-throated supersonic wind tunnel comprising nozzle blocks of pre-shaped contour forming in order progressing downstream, an inlet nozzle section, a first throat, a supersonic expansion section, a parallel walled test section, a supersonic compression section, a second throat, and a subsonic diffusion section, said test section being substantially larger in cross-section than said supersonic expansion section with an abrupt line of demarcation between said sections, a pair of flexible walls attached to said nozzle blocks and following the contour thereof substantially to the first throat in said tunnel, said flexible walls then being disposed in a steadily diverging manner downstream of said first throat to the beginning of the test section, and means for deforming the diverging section of said flexible walls to conform with the contour of said nozzle blocks, said means comprising rods attached to said walls and extending through passages in said nozzle blocks.

ROBERT H. JOHNSON.

REFERENCES CITED

The following references are of record in the file of this patent:

UNITED STATES PATENTS

| Number | Name | Date |
| --- | --- | --- |
| 2,409,433 | Hunter | Oct. 15, 1946 |
| 2,424,654 | Gamble | July 29, 1947 |
| 2,472,949 | Jackson | June 14, 1949 |